US008497760B2

(12) United States Patent
Whalen et al.

(10) Patent No.: US 8,497,760 B2
(45) Date of Patent: Jul. 30, 2013

(54) ADAPTIVE MIDI WIND CONTROLLER DEVICE

(75) Inventors: David S. Whalen, Scotia, NY (US); James J. Luther, Schenectady, NY (US); Michael C. Dicesare, Albany, NY (US)

(73) Assignee: My Music Machines, Inc., Oradell, NJ (US)

( * ) Notice: Subject to any disclaimer, the term of this patent is extended or adjusted under 35 U.S.C. 154(b) by 478 days.

(21) Appl. No.: 12/745,091

(22) PCT Filed: Nov. 26, 2008

(86) PCT No.: PCT/US2008/084935
§ 371 (c)(1),
(2), (4) Date: Sep. 15, 2010

(87) PCT Pub. No.: WO2009/070711
PCT Pub. Date: Jun. 4, 2009

(65) Prior Publication Data
US 2011/0025455 A1 Feb. 3, 2011

Related U.S. Application Data

(60) Provisional application No. 60/996,662, filed on Nov. 28, 2007.

(51) Int. Cl.
*G09B 21/00* (2006.01)

(52) U.S. Cl.
USPC .......................... 340/4.1; 340/539.12; 341/21

(58) Field of Classification Search
USPC ............... 340/4.1, 4.11, 4.12, 539.12; 341/21
See application file for complete search history.

(56) References Cited

U.S. PATENT DOCUMENTS 4,385,541 A * 5/1983 Muller et al. .................. 84/658

(Continued)

FOREIGN PATENT DOCUMENTS

| | | | |
|---|---|---|---|
| JP | U1990132298 | | 11/1990 |
| JP | 10198365 A | * | 7/1998 |
| JP | 2004015135 A | * | 1/2004 |
| JP | 2006065982 A | * | 3/2006 |

OTHER PUBLICATIONS

The Magic Flute—The Head Sets the Tone, http://www.mybreathmymusic.com/en/magic_flute.php Accessed on Feb. 27, 2013.*

*Primary Examiner* — Brian Zimmerman
*Assistant Examiner* — Sara Samson
(74) *Attorney, Agent, or Firm* — Fox Rothschild, LLP; Richard C. Woodbridge; Ryan Miller

(57) ABSTRACT

Provided is a system controller device intended for use by persons having limited or no use of their hands. The device includes a first air sensor configured to provide a first electromagnetic signal representative of an air pressure or an air-flow, or a combination thereof, a second orientation sensor configured to provide a second electromagnetic signal representative of a relative orientation or a change of orientation, or a combination thereof, of said first sensor, a third linear position sensor configured to provide a third electromagnetic signal representative of a relative position or change of position, or a combination thereof, of said first sensor along a linear carriage, and a signal processor configured to combine said first, said second and said third electromagnetic signals to provide an event message.

22 Claims, 13 Drawing Sheets

U.S. PATENT DOCUMENTS 5,054,361 A * 10/1991 Usa .................................. 84/737
5,460,186 A * 10/1995 Buchhold ..................... 600/590
6,538,189 B1 * 3/2003 Ethington ....................... 84/615
2005/0145100 A1 * 7/2005 Ramstein ........................ 84/645

* cited by examiner

21

ADAPTIVE MIDI WIND CONTROLLER DEVICE

CROSS REFERENCE TO RELATED APPLICATIONS

This application claims the benefit of PCT Patent Application No. PCT/US08/84935 entitled "ADAPTIVE MIDI WIND CONTROLLER SYSTEM" filed on Nov. 26, 2008, which is assigned to a common assignee, which claims priority from U.S. Provisional Patent Application No. 60/996,662 filed on Nov. 28, 2007, by B. Dillon, et al. titled "ADAPTIVE MIDI WIND CONTROLLER SYSTEM." This application also claims priority from U.S. Provisional Patent Application No. 61/260,091 filed on Nov. 11, 2009, by M. DeCesare, et al. titled "JAMBOXX."

FIELD OF THE INVENTION

This invention generally relates to air activated system controllers, and more particularly, to air activated system controllers used to control software packages and hardware and employed as a musical instrument.

BACKGROUND OF THE INVENTION

The area of control of systems such as computers and their associated hardware and software is dominated by hand held or hand controlled devices, such as but not limited to, a computer mouse, a touch screen, joystick, track ball, etc. As explained in PCT Patent Application No. PCT/US08/84935 filed Nov. 26, 2008, hereinafter "the PCT Patent Application" and the U.S. Provisional Patent Application No. 60/996,662 filed Nov. 28, 2007 upon which it is based, there are situations where hands free control of a system is desirable. Indeed, there are some situations, such as persons with disabilities, where the only possible practical control of a system must necessarily be hands free. Consider, for example, physically handicapped people who are physically unable to use hand controlled devices, or who may do so only with difficulty. A quadriplegic may, for instance, be limited to control of limited head motion, speech and the ability to sip or blow.

Although the original adaptive MIDI wind controller described in the PCT Patent Application represents a usable solution for physically handicapped persons, there remains a need for several important improvements or extensions to the original device.

A wind controller device for use by physically handicapped persons should operate with minimal resistance to motion, particularly side-to-side or lateral motion. This is desirable for several reasons, including reducing the strain on the head and neck muscles from prolonged use, and to minimize wear and tear on the device's slider assembly, thereby prolonging its usable life. While minimal resistance is preferred, there is also a need for the device to provide structural integrity over time with respect to movement, both in the lateral side-to-side and rotational orientation movement. In order to provide minimal resistance while meeting the need for structural integrity, an improved dual rail carriage slider system and linear sensor would be beneficial. Also, a resistance free or frictionless sensor is desirable. Additionally, a wireless process for communicating controller information to a target system, such as use of an of LED (Light Emitting Diode), which is then electronically visually monitored and converted to position and orientation information in real-time, would also be desirable.

A person using the MIDI wind controller often must visually coordinate their use of the device with the desired output—such as, for example, when the device is used to mimic a musical instrument. It would be greatly helpful in many applications for the user to be provided with tactile feedback as to the lateral (i.e., "x-axis") position of the mouthpiece. In some applications, it would also be desirable for tactile feedback to include tactile protrusions and/or vibrations indicating location along the x-axis.

It is also desirable to optionally provide as many different types of input as possible for a physically handicapped person to take advantage of when using the device. Thus, provision of addition input sensors, including switch jacks, as depicted on the bottom view of the unit in FIG. 8, or a bite sensor, would be useful.

The mouthpiece is the element of the MIDI wind controller device with which the user directly has physical contact. In many settings, there is a need for various users to share the device, often for cost reasons. For sanitary use by more than one person, and for other reasons, it is desirable to provide a mouthpiece for the MIDI wind controller device which is disposable so that multiple users may use a single instrument, be easily reattachable by friction, and be a non-choking hazard.

SUMMARY OF THE INVENTION

An aspect of the present invention provides a system controller device for hands-free control of a system, particularly a musical instrument simulation. The device includes a first air sensor configured to provide a first electromagnetic signal indicating an air pressure or an air-flow, or a combination thereof, a second orientation sensor configured to provide a second electromagnetic signal indicating a relative orientation or a change of orientation, or a combination thereof, and a third linear position sensor configured to provide a third electromagnetic signal indicating relative position or change of position, or a combination thereof, of said first sensor along a linear carriage, as well as a signal processor configured to combine said first, said second and said third electromagnetic signals to provide an event message.

In alternative embodiments of the invention, the linear carriage either includes two rails, a linear potentiometer and a wiper, or two rails and a linear optical encoder. The rotary orientation sensor similarly may be a rotary potentiometer or may be a rotary optical encoder.

Additional optional variations of the present invention include, but are not limited to, the provision of tactile strips to provide tactile feedback of the linear position to the user, a vibration motor to provide additional feedback to the user, a bite sensor to allow communication of additional information by the user, and use of a disposable barrier for hygienic considerations when the device may be used by more than one user.

DETAILED DESCRIPTION

In the following description, for purposes of explanation, specific numbers, materials and configurations are set forth in order to provide a thorough understanding of the invention. It will be apparent, however, to one having ordinary skill in the art, that the invention may be practiced without these specific details. In some instances, well-known features may be omitted or simplified so as not to obscure the present invention. Furthermore, reference in the specification to "one embodiment" or "an embodiment" means that a particular feature, structure or characteristic described in connection with the embodiment is included in at least one embodiment of the invention. The appearances of the phrase "in an embodiment" in various places in the specification are not necessarily all referring to the same embodiment.

An embodiment of the present invention advantageously provides for a wind controller device for use by physically handicapped persons which operates with minimal resistance to motion, thereby reducing the strain on the user's head and neck muscles from prolonged use, and minimizing wear and tear on the device's slider assembly, thus prolonging its usable life. The dual rail carriage slider system provides structural integrity over time with respect to movement, both in the lateral side-to-side and rotational orientation movement, with minimal resistance or frictionless.

In another embodiment of the present invention, a wireless process for communicating linear carriage positioning to a target system, such as a of LED (Light Emitting Diode) which is then electronically visually monitored and converted to position and orientation information in real-time, is also advantageously provided.

Another advantageous aspect of the present invention for use in several embodiments is the provision of tactile feedback to the user in the form of a tactile strip allowing the user to detect the approximate lateral (i.e., "x-axis") position of the mouthpiece. The optional addition of protrusions at spaced intervals along the tactile strip, similar to those provided with some musical instruments, such as a harmonica, also advantageously provides the user with a still greater amount of tactile feedback information. With some applications of the present invention, it may be particularly advantageous to provide vibrational feedback through the mouthpiece indicating location along the x-axis.

The present invention also advantageously provides a bite sensor in an embodiment, allowing the user an additional mode of generating output information for system control.

Another advantage of the present invention is the provision of a mouthpiece for the MIDI wind controller device that is disposable, easily reattachable by friction, and not a choking hazard, allowing multiple users to share a single device without potentially unsanitary cross-contamination.

Figure 1:
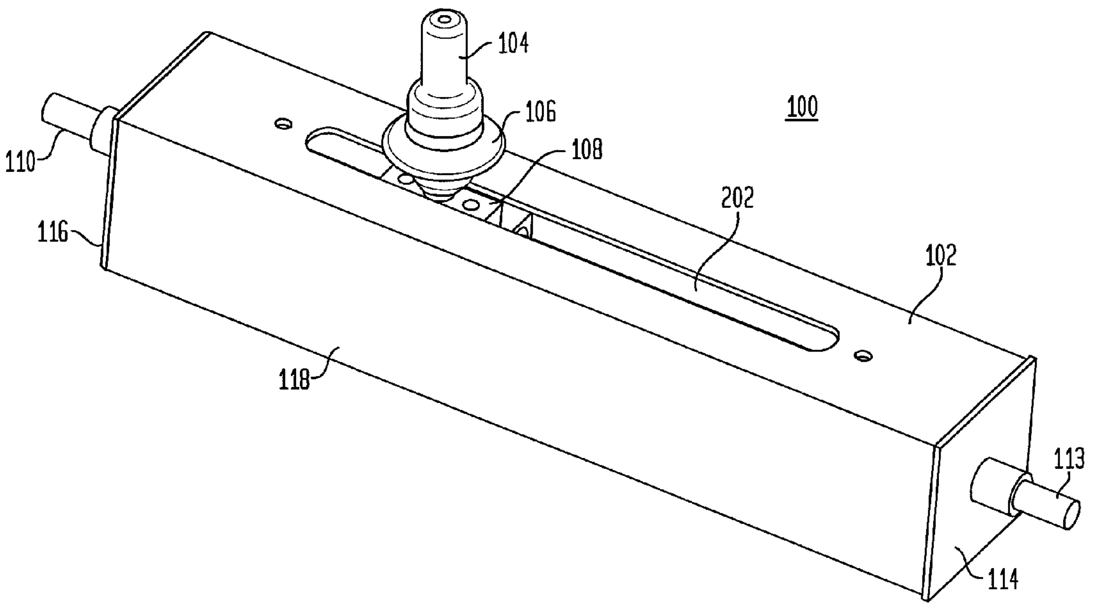
FIG. 1 is a profile view of a system controller device, in accordance with an embodiment of the present invention.

FIG. 1 depicts an exemplary system controller device 100. In an embodiment of the present invention, the controller device 100 includes rectangular sides 118, bottom (not depicted in FIG. 1), and top 102. A mouthpiece 104 is connected to an air sensor assembly 106, and the combination is then affixed to a linear carriage 108, mounted on a dual rail system (not depicted in FIG. 1). The mouthpiece 104/air sensor assembly 106/linear carriage 108 together form a unit, hereinafter referred to as the "mouthpiece/air sensor/carriage assembly," mounted astride linear slot 202, allowing the unit to move along slot 202's major axis, also called the "x-axis". At either end of the device 100 are endplates 114, 116 having openings for partial axles 110, 113 which allowing rotation of the unit 100 about its bisecting longitudinal axis. This rotation is also herein referred to as the unit's rotational orientation, and the rotational movement is also considered movement along the "y-axis," because this movement is often translated to up-and-down movement in several applications, as described below. FIGS. 6, 7, 8, 9 and 10 are side, top, opposite side, end and opposite end plan views of an exemplary system controller device 100.

Figure 2:
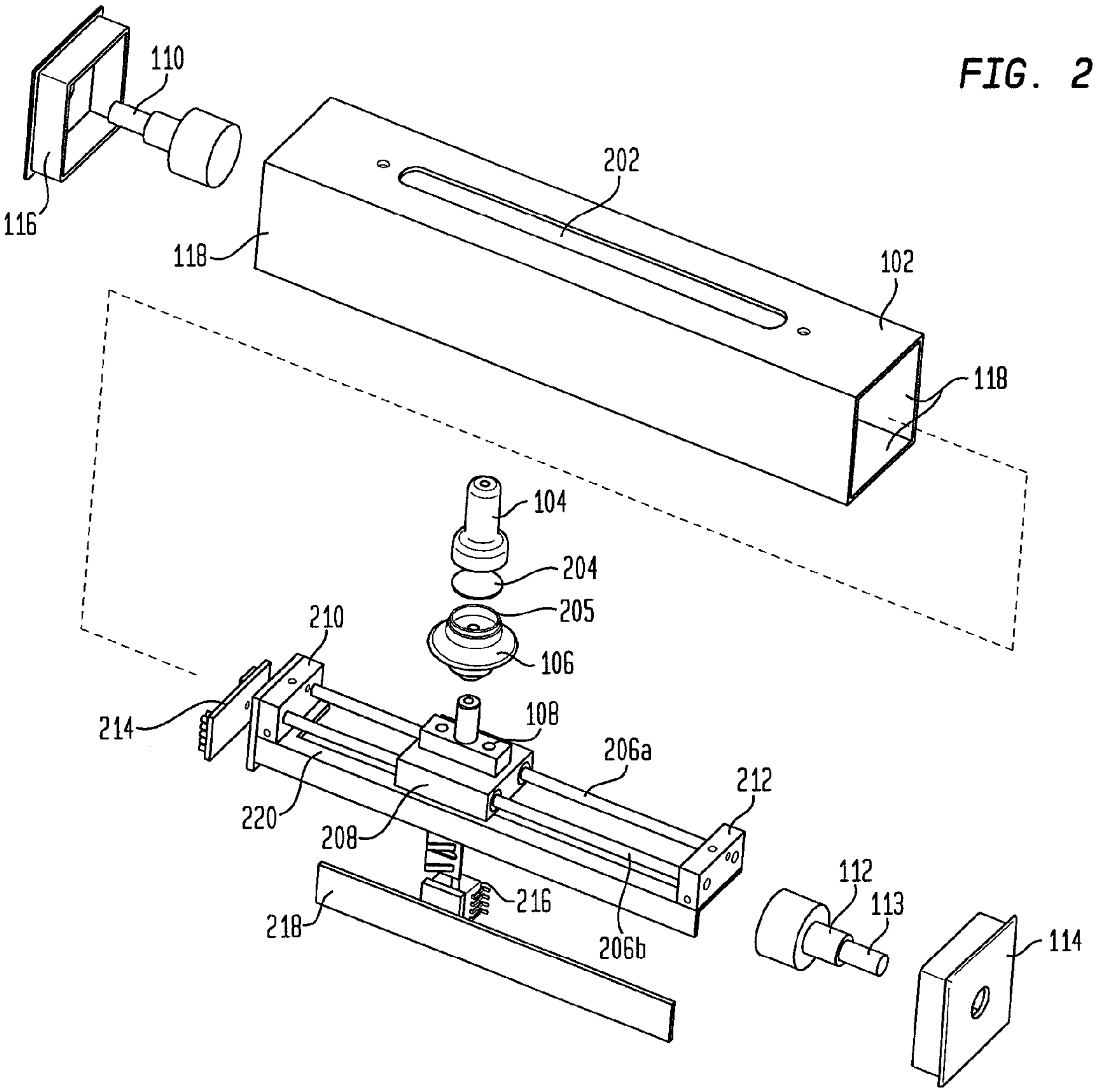
FIG. 2 is a profile of a partially disassembled system controller device, depicting some internal components, in accordance with an embodiment of the present invention.

FIG. 2 depicts a partially disassembled system controller device 100 in accordance with a preferred embodiment of the invention. Additional details are visible with respect to the endplates 114, 116 and partial axles 110, 113. A rotary potentiometer 112 for sensing rotational orientation is provided. Also visible is the rectangular sides 118 and top 102. The mouthpiece 104/air sensor assembly 106 is disassembled to expose retainer washer 205 and diaphram or mechanical bellows 204. It is important to note that use of the particular mouthpiece 104/air sensor assembly 106 used in an embodiment may be substituted by another mouthpiece assembly of similar functionality.

Also visible are additional details of the linear carriage 108, including the carriage base 208, which rides on dual rails 206*a*, 206*b*. In a preferred embodiment of the invention, rails 206*a*, 206*b* are part of a linear sensor which also includes a Vishay linear potentiometer 216 and wiper 220. The linear sensor uses conductive plastic, and resistance to movement may be adjusted by changing the distance the wiper 220 is mounted from the potentiometer 216. Also partially visible is a circuit board 214 for interfacing the sensory components and providing external inputs and/or outputs. Electrical leads from the air sensor assembly 106 and linear potentiometer 216 to the circuit board 214 are not depicted in order to provide drawing clarity, but are necessary for the device to usefully function. In an embodiment of the invention, the necessary leads are provided using a standard ribbon cable, which use is well known in the electrical arts. Power is preferably supplied to the circuit board 214 and other electrical components via a USB 2.0 connector. A battery (not depicted) or DC power supply (not depicted) may be used in alternative embodiments to provide power to the circuit board 214 and other electronic components is also required for operation if the system controller device 100.

The circuit board 214 includes input/output (I/O) components and one or more electronic digital signal processors (DSP) configured to convert electromagnetic signals from the air sensor assembly 106, linear potentiometer 216, and a rotational sensor 112 into event messages for output to the system being controlled. Thus, in a typical embodiment, the circuit board 214 takes as input electromagnetic signals representing air pressure flow, lateral "x-axis" positional information, and orientation "y-axis" information, and convert these into event messages, such as but not limited to MIDI event messages, for output to a system being controlled. The circuit board 214 may also be configured to accept additional electromagnetic signals and provide other output, as described in exemplary embodiments below. Appropriate power supply, interfaces and wiring as needed would then be provided as understood by one of ordinary skill in the electrical arts.

Figure 13:
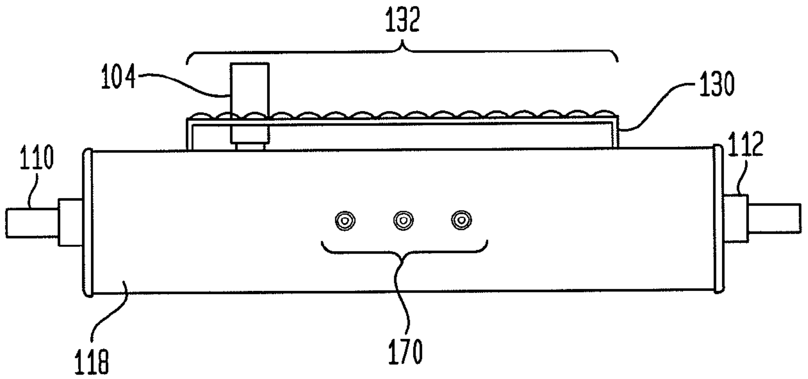
FIG. 13 is a side view of the system controller device depicted in FIG. 11.
Figure 14:
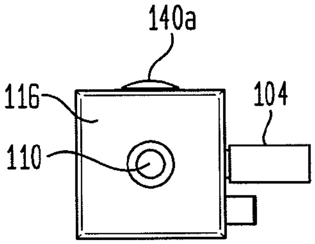
FIG. 14 is an end view of the system controller device depicted in FIG. 11.
Figure 15:
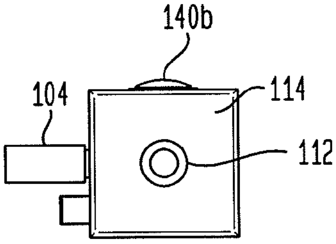
FIG. 15 is an end view of the system controller device depicted in FIG. 11.
Figure 26:
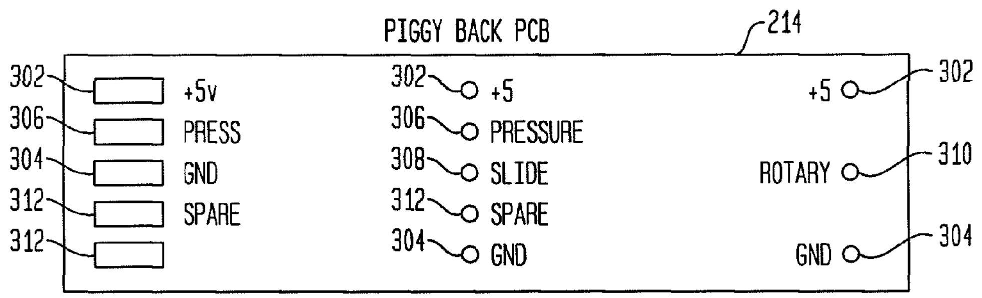
FIG. 26 depicts power, ground and signal lines for a circuit board in accordance with a preferred embodiment of the present invention; and, FIG. 27 depicts a schematic wiring diagram in accordance with a preferred embodiment of the present invention.
Figure 27:
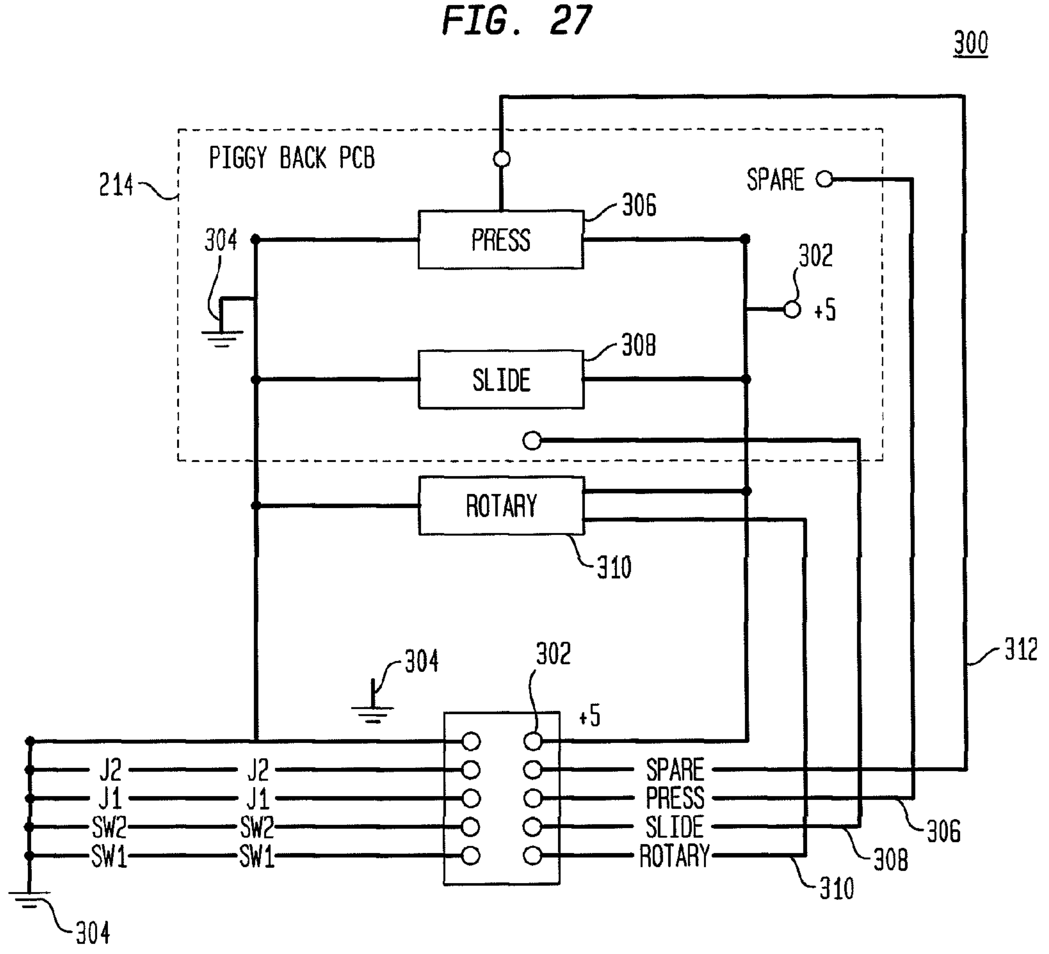

FIGS. 26 and 27 depict circuit board 214 and a schematic wiring diagram in a preferred embodiment of the invention. Connectors are provided for power 302, ground 304, as well as for signal lines for pressure 306 (e.g., from air sensor 106), slide 308 (e.g., from linear potentiometer 216), and rotary (e.g., from rotary potentiometer 112). Each of these components are also provided power and ground lines. Connectors for additional or spare 312 signal, power and ground lines are also provided. Spare 312 signal lines may be wired to external connectors 170 (see FIG. 13) to provide one or more external device access to the circuit board 214 and it's processor.

The circuit board 214 used in a preferred embodiment of the invention employs the U-HID Nano, which is used with a Vishay linear sensor and rotary potentiometer. In an alternative embodiment of the invention, an incremental rotary/linear encoder, also known as a quadrature encoder or relative rotary encoder is used. The quadrative/analog signal produced by the configured U-HID Nano in response to input from the linear potentiometer 216, and rotational sensor communicates relative positioning data. Other input may also be provided to the circuit board 214. Use of an alternative circuit board employing an alternative processor, such as the U-HIDG Nano, which adds an accelerometer as well as other features, is also envisioned.

An alternative embodiment of the device uses an optical encoder (not depicted) to track linear or x-axis movement of the mouthpiece 104/air sensor 106 unit. The optical encoder takes advantage of the carriage based system of the present invention to provide a high resolution linear sensor without the need for a wiper, thereby further reducing resistance. Output of the optical encoder is then provided to the circuit board 214.

As an alternative to an optical encoder, an LED triggers an LED sensor array, offering a touchless and frictionless, high-longevity alternative to linear potentiometers. Depending on the configuration, a large virtual number of unique locations could be derived.

Figure 3:
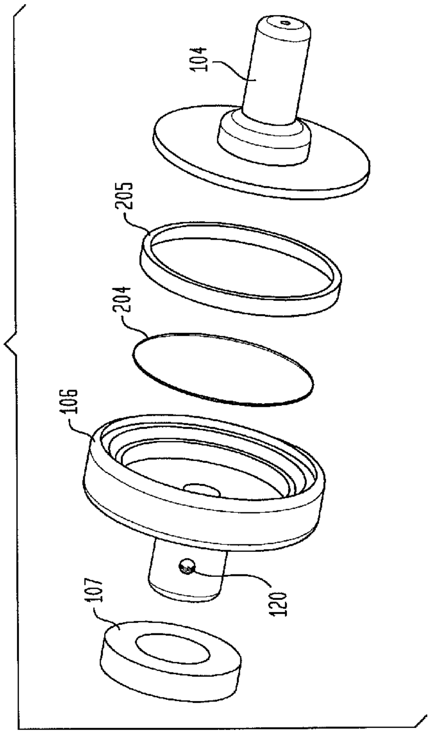
FIG. 3 is a view of a disassembled mouthpiece/air sensor assembly, in accordance with an embodiment of the present invention.
Figure 5:
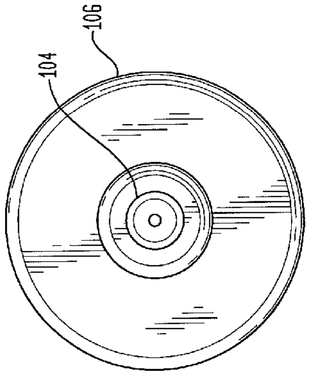
FIG. 5 is another view of a mouthpiece/air sensor assembly, in accordance with an embodiment of the present invention.
Figure 4:
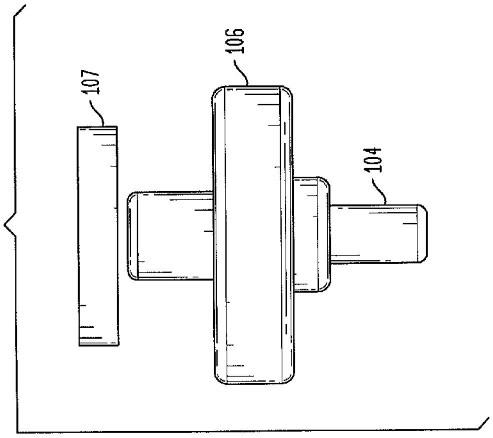
FIG. 4 is another view of a mouthpiece/air sensor assembly, in accordance with an embodiment of the present invention.
Figure 6:
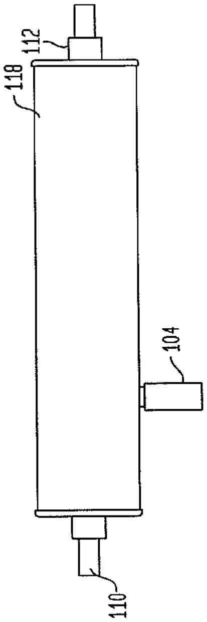
FIG. 6 is a side view of a system controller device, in accordance with an embodiment of the present invention.
Figure 7:
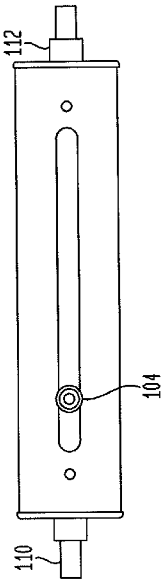
FIG. 7 is a top view of the system controller device depicted in FIG. 6.
Figure 8:
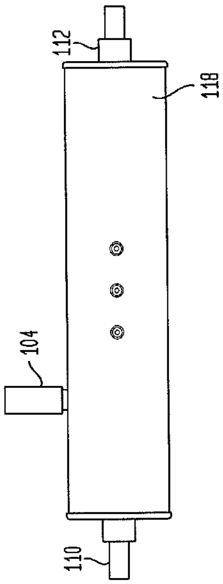
FIG. 8 is a side view of the system controller device depicted in FIG. 6.
Figure 9:
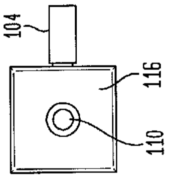
FIG. 9 is an end view of the system controller device depicted in FIG. 6.
Figure 10:
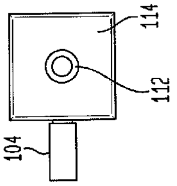
FIG. 10 is and end view of the system controller device depicted in FIG. 6.

FIG. 3 is a view of an exemplary disassembled mouthpiece 104/air sensor 106 assembly. In the particular embodiment shown, the mouthpiece 104 is mated to the air sensor 106 with a retainer ring 205 and diaphragm or mechanical bellows 204 in between. Those of skill in the art will appreciate that alternatives to this assembly are possible without deviating from the spirit and scope of the invention. Likewise, FIGS. 4 and 5 are side and top views, respectively, of an exemplary mouthpiece 104/air sensor 106 assembly.

Also shown in FIG. 3 and present in a preferred embodiment of the present invention is pressure stabilizer 107. Pressure stabilizer 107 forms an o-ring, rubber gasket, or washer and is fitted between the air sensor 106 and linear carriage 108 to prevent constant triggering along the z-axis. The pressure stabilizer 108 acts to stabilize the air pressure of the air sensor 106 between user blows or sips and as the mouthpiece 104/air sensor 106 assembly is linearly moved. In a preferred embodiment, the pressure stabilizer 107 is used in conjunction with an air bleeder valve 120 to stabilize pressure after the air sensor 106 is frictionally fitted to the linear carriage 108.

In operation, the air sensor 106 is configured to provide an electromagnetic signal in response to an air pressure and/or an air-flow. An orientation sensor is also provided to produce an electromagnetic signal in response to rotational orientation of the device about the longitudinal axis, also referred to herein as movement on the "y-axis," due to its frequently being mapped to vertical, y-axis cursor movement on a computer display. This "y-axis" rotational movement depicted in FIGS. 22, 23, 24 and 25, as well as in FIG. 19. In an embodiment of the invention, a self-centering spring (not depicted) is used to stabilize tilt/rotation, automatically centering the device approximately in the middle of its movement range. This has the advantage of allowing the device to remain in a comfortable position even when the user does not have their mouth on the mouthpiece 104.

A linear position sensor is also included to provide an electromagnetic signal indicating a relative position or change of position of the air sensor 106 along the linear carriage, or x-axis. These electromagnetic signals, are then input to the circuit board 214, which includes a processor configured to combine the signals and generate an event message, which is then output to the system being controlled.

In an embodiment of the invention, the orientation sensor is a rotary optical encoder. Like the use of a linear optical encoder instead of a linear potentiometer, use of a rotary optical encoder also reduces friction or resistance to movement of the mouthpiece 104/air sensor 106 assembly, but in its rotational or orientation, rather than linear positioning.

Another embodiment of the invention includes an LED (Light Emitting Diode) mounted internally within the device onto the linear carriage assembly or onto the air sensor 106. In operation, the LED triggers LED sensors that are individually illuminated in correspondence to the mouthpiece 104/air sensor 106's linear and rotational orientation position, and the illumination is read by a sensing device not mounted on the dual track, which sensing device then communicates the detected positional information to the circuit board's 214 processor. This configuration also reduces resistance or friction due to movement of the mouthpiece 104/air sensor 106.

Certain embodiments of the invention include a bite sensor, which is connected to the mouthpiece. The bite sensor provides an electromagnetic signal indicating biting or pressing on the mouthpiece. As with the other electromagnetic signals, this signal is then input to the circuit board 214 and combined with the other signals into an event message.

FIGS. 11, 12, 13, 14, and 15 are side, top, opposite side, end and opposite end plan views of an embodiment of the system controller device incorporating optional additional features. One such feature are the buttons 140*a* and 140*b*, which may be provided and configured to additional input for use by a system being controlled. For example, in a musical instrument application of the present invention, buttons 140*a* and 140*b* might be configured to select different instruments or scales when depressed.

Figure 11:
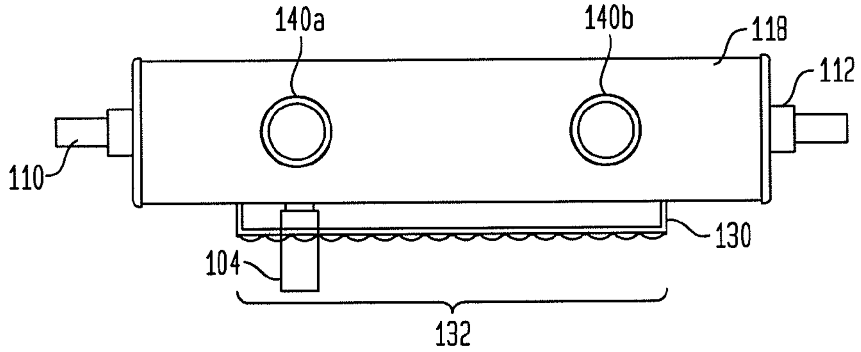
FIG. 11 is a side view of a system controller device, in accordance with an embodiment of the present invention.
Figure 12:
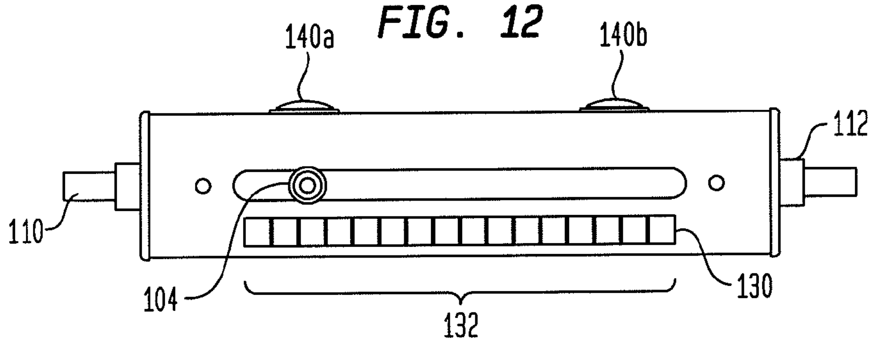
FIG. 12 is a top view of the system controller device depicted in FIG. 11.

Also depicted in FIGS. 11 and 12 is a tactile strip 130 mounted to side 118 alongside the mouthpiece/air sensor/carriage for providing tactile references, such as protrusions 132 which may be used to provide positional feedback to a user by touch, in an embodiment of the invention. In one embodiment of the invention, the tactile strip 130 itself is removeably attachable to side 118, allowing the use of different tactile strips 130 having various arrangement of protrusions 132. Removable tactile strip 130 also potentially improves sanitary considerations when the device is used by multiple users, as each user would attach their own personal tactile strip 130.

Figure 16:
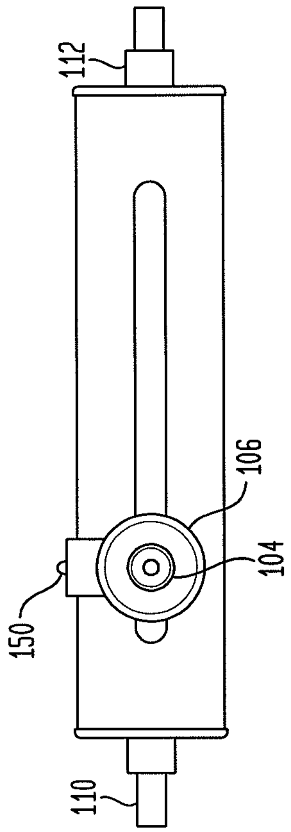
FIG. 16 is a side view of a system controller device fitted with an LED for sensing linear position, in accordance with an embodiment of the present invention.

In an exemplary embodiment of the invention presented in FIG. 16, a LED (light emitting diode) 150 mounted onto the mouthpiece 104/air sensor 106 unit opposite the mouthpiece and visible from the exterior of the device provides x-axis and y-axis tracking information. A sensor, processor and appropriate interfacing is required to externally read the LED's position and determine the mouthpiece 104/air sensor 106 x-axis position accordingly. This embodiment of the invention also has the advantage of reducing linear friction or resistance of movement along the x-axis to a minimal level.

Figure 17:
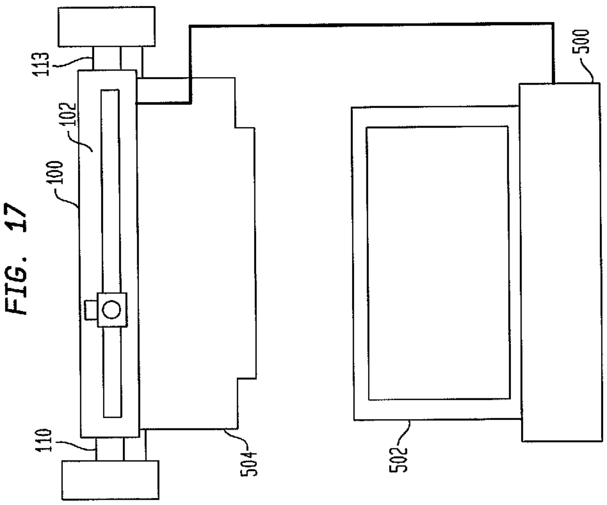
FIG. 17 is a schematic diagram of a system controller and system being controlled, in accordance with an embodiment of the present invention.

FIG. 17 is a block diagram depicting the system controller device and associated components in a typical configuration. The device 100 is shown in communication with a computer 500, which is in turn connected to computer display 502. Also depicted is the use of a standard harmonica mount 504. Mount 504 may be used, although alternative means of mounting the device 100 for use are envisioned. For example, in an embodiment, the harmonica rack is replaced with the system controller device mounted on by its partial axles 110, 113, thereby providing up to 360 degrees of rotation about the axles 110, 113 to a user. A spring-loaded or other device (not depicted) may also be employed to automatically center the device in a preferred rotational orientation, as well as to provide torsional feedback as the device is rotated away from the centered position.

Figure 18:
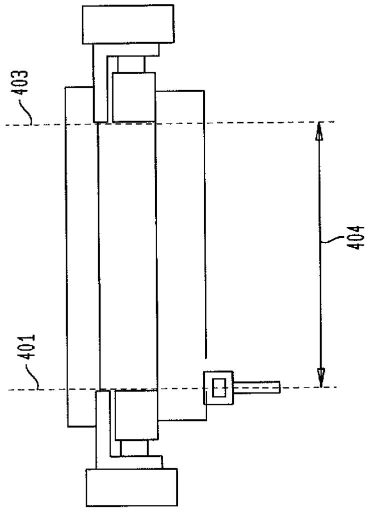
FIG. 18 is side view of a system controller device showing an exemplary x-axis range of motion, in accordance with an embodiment of the present invention.
Figure 19:
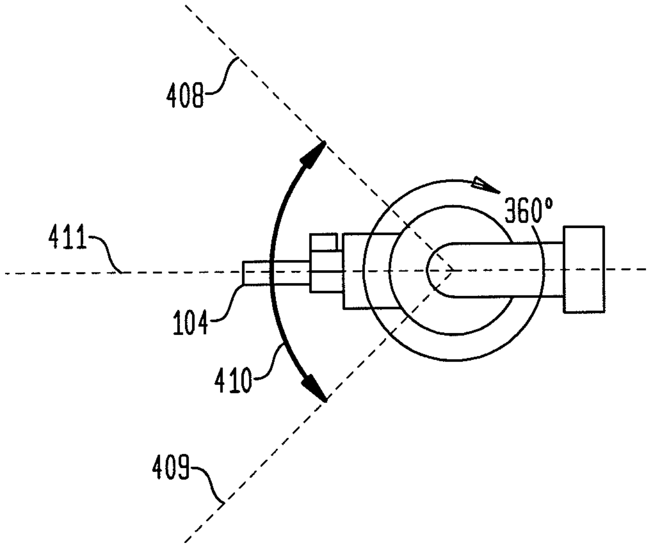
FIG. 19 is an end view of a system controller device showing an exemplary orientation rotational "y-axis" range of motion, in accordance with an embodiment of the present invention.

A top view of the device is depicted in FIG. 18. Also shown is the lateral, or x-axis, range of movement 404 for the mouthpiece/air sensor/carriage, from 401 to 403. Similarly, FIG. 19 shows an exemplary centered position 411 as well as an exemplary rotational range 410, from position 408 to 409, through which the mouthpiece/air sensor/carriage might be easily moved.

Figure 20:
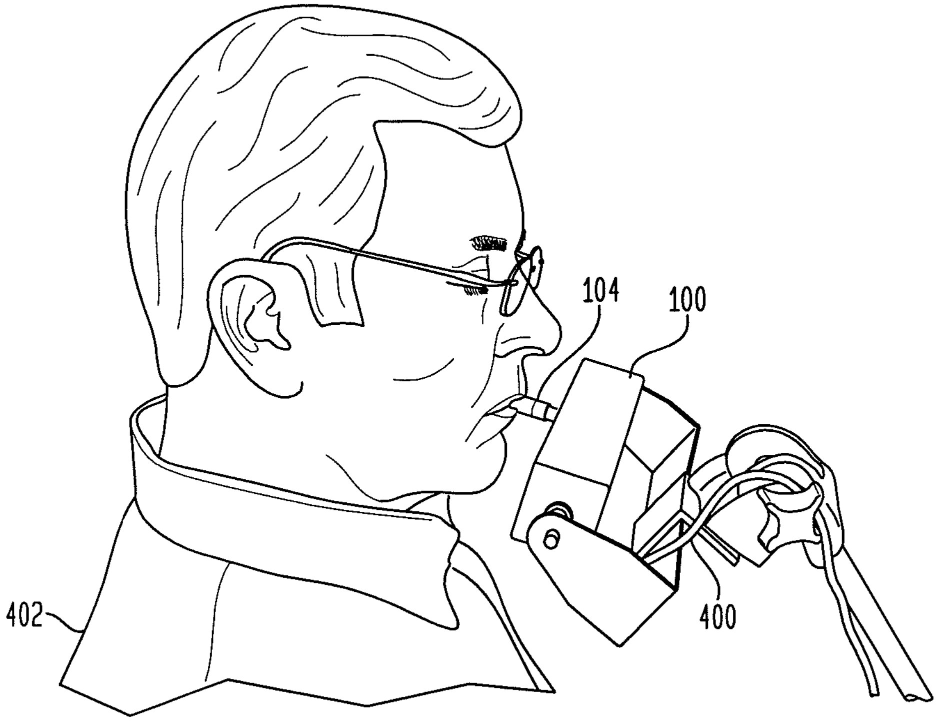
FIG. 20 is a depiction of a system controller device in use, in accordance with an embodiment of the present invention.
Figure 21:
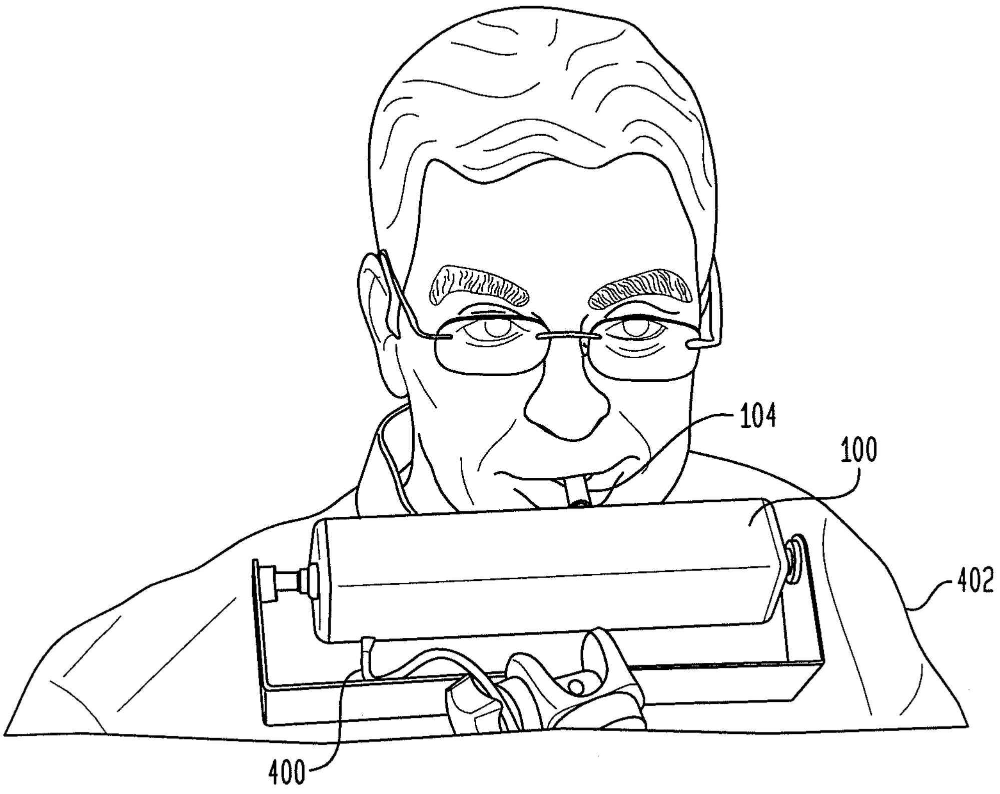
FIG. 21 is another depiction of the system controller device of FIG. 20 in use.

FIGS. 20 and 21 depict an embodiment of the inventive system controller device 100 in use by a typical user 462. As shown, the user 452 operates the device with their mouth on the mouthpiece 104. By blowing or sipping, the user 462 causes the generation of electromagnetic signals which are conveyed to the circuit board, converted to event signals, and communicated to the system being controlled via interface cabling 400. Lateral x-axis and orientation rotation "y-axis" electromagnetic signal information generation is also caused by the user 402 moving their mouth side-to-side or up and down, respectively, the signals also being converted to event signals by the circuit board and communicated to the controlled system over the interface cabling 400. Electrical operating power may optionally be provided to the device over appropriate interface cabling 400, by additional external wiring (not depicted), or by an internal battery (not depicted). A wireless signal interface with a controlled computer system may also be used.

FIGS. 22, 23, 24 and 25 are schematic diagrams depicting several examples of the inventive controller device 100 in use with various applications. In each of these examples, the controller device 100 is pictured, with mouthpiece 104 and tactile strip 130. Additional details have been omitted for drawing clarity. The system being controlled is a computer device represented as a keyboard 504 and associated monitor 502. Interface and power cabling for the device and the system being controlled are omitted from the figures. These would be provided as needed by the particular configuration, as those of ordinary skill in the electronic and computer arts would understand.

Figure 22:
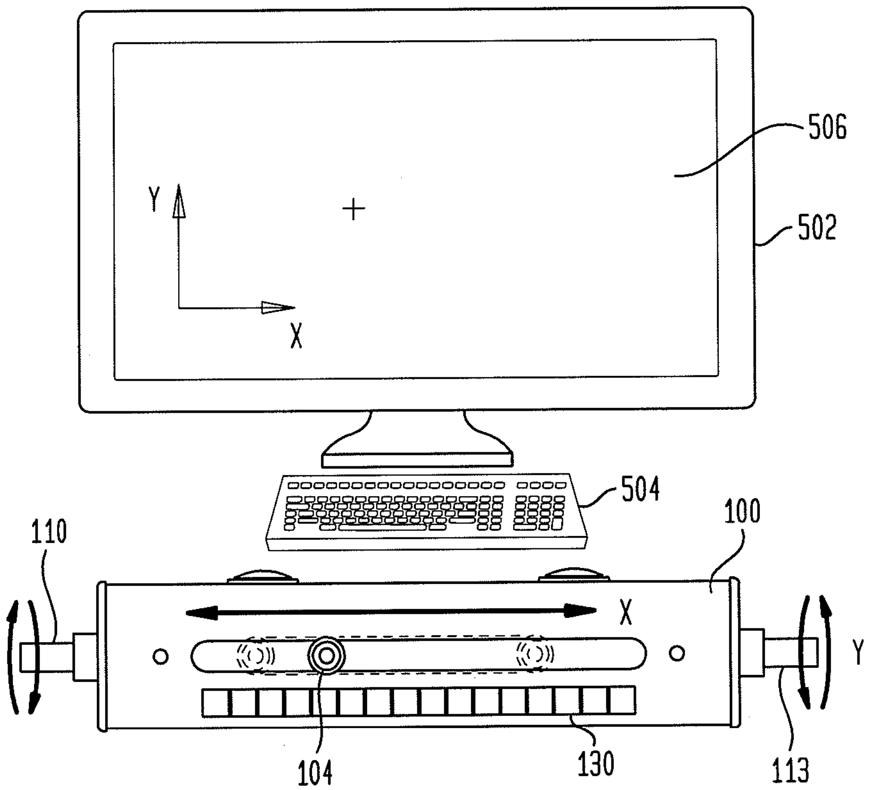
FIG. 22 depicts a typical mapping of mouthpiece movement to on-display user interface cursor movement, in accordance with an embodiment of the present invention.

FIG. 22 depicts a typical computer screen showing the relationship between on-screen mouse cursor "+" movement and lateral x-axis and orientation "y-axis" movement of the inventive controller device. As indicated, moving the mouthpiece 104 side-to-side along the x-axis generates electromagnetic signals which are converted to event messages causing corresponding cursor movement along the "X" direction on the display 506. Similarly, "y-axis" rotational movement about the device's axles 110, 113 generates electromagnetic signals causing event messages corresponding to cursor movement along the "Y" direction on the computer display 506. Likewise, a joystick or other input device may alternatively be mimicked using the device.

Figure 23:
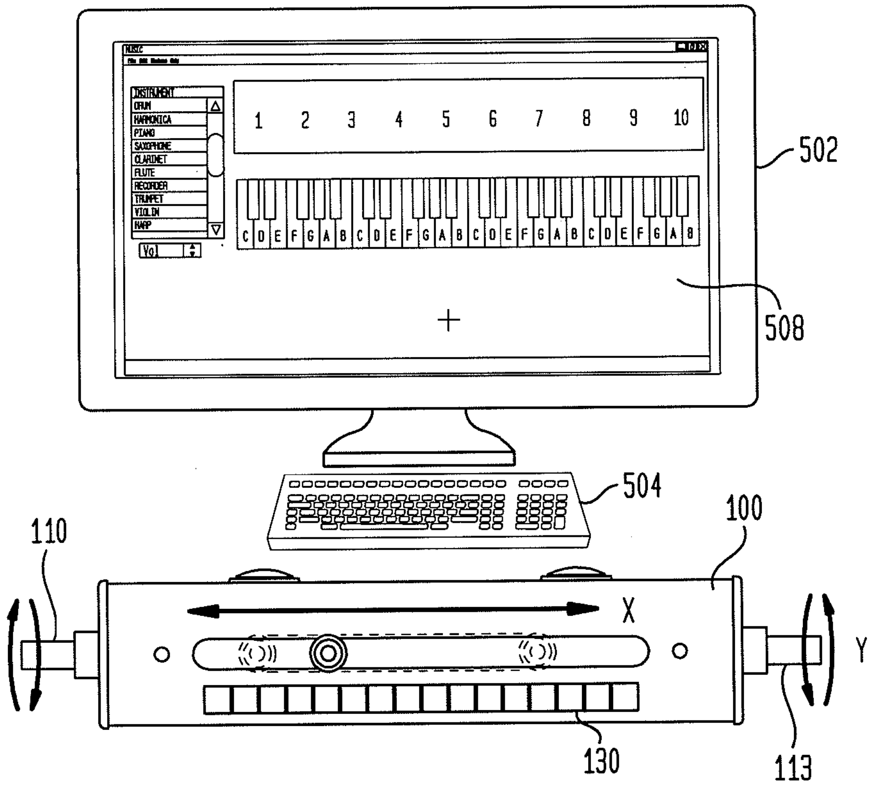
FIG. 23 depicts a typical user interface for a music-playing application, in accordance with an embodiment of the present invention.

FIG. 23 depicts an exemplary musical application—e.g., playing a piano—on the controlled computer system. As shown in the sample display 508, the user is presented with various controls, not depicted here in detail, for assigning piano keys, ranges and effects to various air pressures, lateral and orientation rotary movements of the controller device. "X" and "Y" movement, as well as air sensor 106 output are converted into appropriate MIDI messages to play the selected instrument. Electromagnetic signal output from the device may be used for any MIDI-assignable functions.

Another musical application of the present invention is use as either a hand-held or hands-free harmonica. In such use, a harmonica rack may be employed to provide hands-free use, or the device may either be held in one or both of the user's hands.

Figure 24:
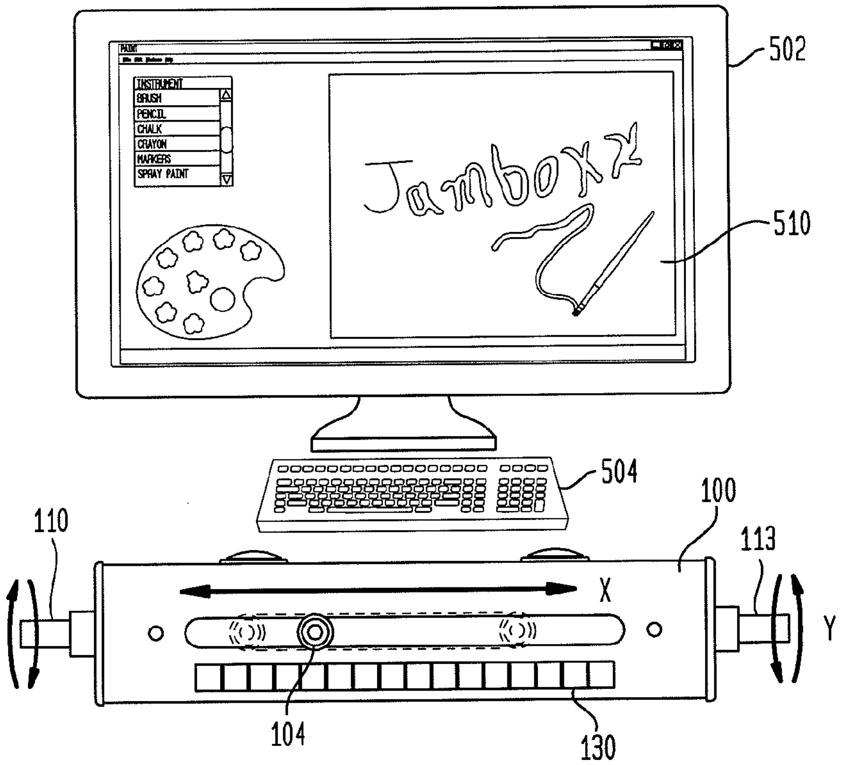
FIG. 24 depicts a typical user interface for a drawing application, in accordance with an embodiment of the present invention.

FIG. 24 depicts use of the present invention in a drawing application. In an embodiment of the invention, the user is presented with a display 510 having a drawing area, at least one menu for selecting various modes, and a palette for selecting colors, etc. Depiction of these controls is not intended to be limiting, but rather illustrative, and the broadest array of various menus, controls and interface may also be employed. In exemplary operation the user would move the cursor in the "X" and "Y" directions as taught in FIG. 24. Air pressure may then be used to perform the appropriate function depending on the position of the cursor in the application display. For example, if the cursor is located on the color palette when the user blows/sips into the mouthpiece, the application would then select the color over which the cursor sits as the current color for drawing with. Subsequent movement of the cursor over the drawing area, followed by additional blowing into the mouthpiece would then cause deposition in the current color at the cursor position. Likewise, movement of the cursor over a menu area of the display 510, followed by blowing would cause selection of the appropriate menu item.

Figure 25:
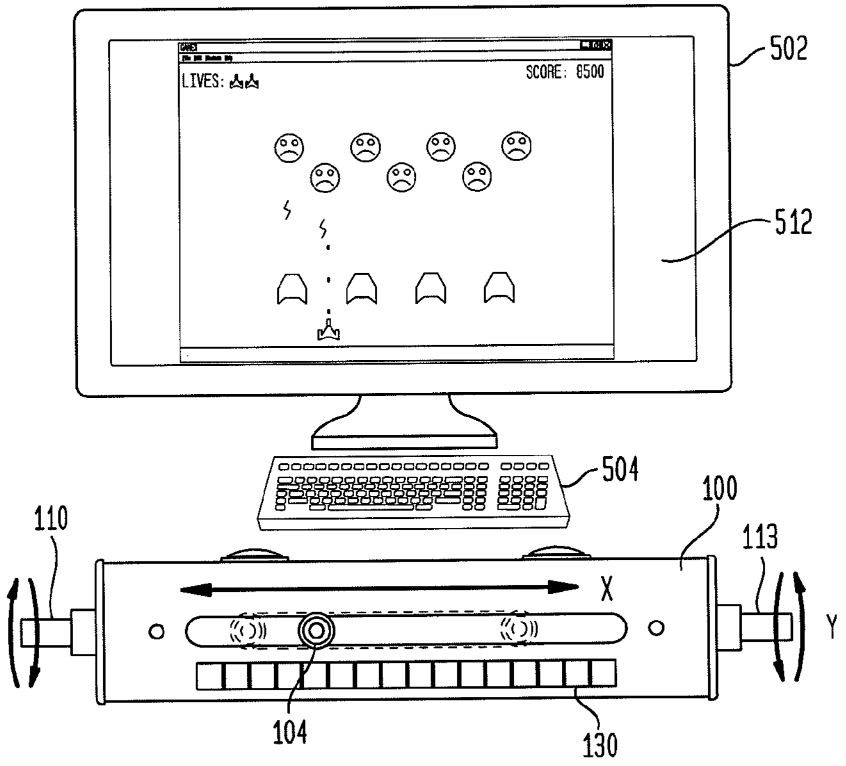
FIG. 25 depicts a typical user interface for a game-playing application, in accordance with an embodiment of the present invention.

FIG. 25 depicts an exemplary embodiment of the present invention as a computer game controller. The user is presented with a display 510 of a computer game. As with other applications, movement of the cursor or relevant game icon in the "X" and "Y" directions may be controlled by corresponding movement of the mouthpiece of the present invention along the x-axis and "y-axis" rotation, respectively. Blowing/sipping into the mouthpiece would then perform another game action—such as, but not limited to, firing a weapon, or the like.

Additional applications for the present invention are also envisioned. For example, the device may be used to control a motorized wheelchair, with "X" and "Y" movement and air sensor 106 output appropriately mapped to wheelchair control functions. Another application of the present invention is in environmental control, whereby a user can set a thermostat temperature, turn on or off heating or air conditioning, etc., without limitation.

Another application for the present invention is the use of the blowing/sipping respiratory functionality to achieve feedback for controlling blood pressure or improving lung/pulmonary capacity. For example, stacked breath exercises or respiratory therapy can be performed to increase pulmonary capacity and improve blood pressure. Breathing exercises may combine computer software on the controlled system and gradual mouthpiece airflow modification.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A system controller device comprising:

a air sensor configured to provide a first electromagnetic signal representative of an air pressure or an air-flow, or a combination thereof;

a orientation sensor configured to provide a second electromagnetic signal representative of a relative orientation or a change of orientation, or a combination thereof, of said air sensor;

a linear position sensor configured to provide a third electromagnetic signal representative of a relative position or change of position, or a combination thereof, of said air sensor along a linear carriage; and, a signal processor configured to combine said first, said second and said third electromagnetic signals to provide an event message.

2. The system controller device according to claim 1, wherein said linear carriage comprises two rails, a linear potentiometer and a wiper.

3. The system controller device according to claim 1, wherein said linear carriage comprises two rails and a linear optical encoder.

4. The system controller device according to claim 3, wherein said orientation sensor comprises an analog rotary potentiometer.

5. The system controller device according to claim 3, wherein said orientation sensor comprises a rotary optical encoder.

6. The system controller device according to claim 1, further comprising a tactile strip mounted along said linear carriage providing at least one tactile reference protrusion which may be employed to determine position of said air sensor along said linear carriage by touch.

7. The system controller device according to claim 1, further comprising:

a mouthpiece attached to said first air sensor; and a bite sensor connected to said mouthpiece, said bite sensor configured to provide a fourth electromagnetic signal representative of biting or pressing on a mouthpiece, said signal processor further configured to combine said fourth electromagnetic signal with said first, said second and said third electromagnetic signals to provide an event message.

8. The system controller device according to claim 7, wherein the bite sensor comprises an air bladder located within said mouthpiece.

9. The system controller device according to claim 1, further comprising:

a mouthpiece attached to said air sensor; and a barrier system attachable to said mouthpiece, said barrier system protecting said mouthpiece from contamination during use.

10. The system controller device according to claim 1, further comprising a software programmable device configured to convert said event messages to an audio signal.

11. The system controller device according to claim 10, wherein the audio signal is representative of a musical instrument.

12. The system controller device according to claim 11, wherein at least one of the electromagnetic signals is used for any MIDI-assignable functions.

13. The system controller device according to claim 11, further comprising at least one external input.

14. The system controller device according to claim 11, wherein said software programmable device is configured to assign one or more musical scales or MIDI functions to any of the first, second or third electromagnetic signals.

15. The system controller device according to claim 1, further comprising a software programmable device configured to convert said event messages to control a computer mouse.

16. The system controller device according to claim 1, further comprising a software programmable device configured to convert said event messages to control a joystick.

17. The system controller device according to claim 1, further comprising a software programmable device configured to convert said event messages to control a gaming input for an electronic gaming device.

18. The system controller device according to claim 1, further comprising a software programmable device configured to convert said event messages to control a motorized wheelchair.

19. The system controller device according to claim 1, further comprising a software programmable device configured to convert said event messages to control environmental controls.

20. The system controller device according to claim 1, further comprising a software programmable device configured to be used for respiratory/pulmonary therapy and feedback to enhance cardiovascular health.

21. The system controller device according to claim 11, wherein the musical instrument is a hand-held harmonica.

22. The system controller device according to claim 21, further comprising a hands-free harmonica-style mount.

* * * * *